United States Patent
Seigle et al.

(10) Patent No.: US 9,223,789 B1
(45) Date of Patent: Dec. 29, 2015

(54) RANGE RETRIEVALS FROM ARCHIVED DATA OBJECTS ACCORDING TO A PREDEFINED HASH TREE SCHEMA

(71) Applicant: Amazon Technologies, Inc., Reno, NV (US)

(72) Inventors: Mark Christopher Seigle, Seattle, WA (US); Kamran Tirdad, Seattle, WA (US); Colin Laird Lazier, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 149 days.

(21) Appl. No.: 13/827,137

(22) Filed: Mar. 14, 2013

(51) Int. Cl.
*G06F 17/30* (2006.01)

(52) U.S. Cl.
CPC .............................. *G06F 17/30073* (2013.01)

(58) Field of Classification Search
None
See application file for complete search history.

(56) References Cited

U.S. PATENT DOCUMENTS

| | | | |
|---|---|---|---|
| 5,727,201 A | 3/1998 | Burke | |
| 6,757,686 B1* | 6/2004 | Syeda-Mahmood et al. | G06F 17/30 |
| 7,856,437 B2 | 12/2010 | Kirshenbaum | |
| 8,041,677 B2 | 10/2011 | Sumner et al. | |
| 2008/0005324 A1* | 1/2008 | Ge et al. | 709/225 |
| 2009/0037500 A1* | 2/2009 | Kirshenbaum | 707/206 |
| 2010/0037031 A1* | 2/2010 | DeSantis et al. | 711/162 |
| 2011/0082945 A1* | 4/2011 | Myers et al. | 709/231 |

\* cited by examiner

*Primary Examiner* — Son T Hoang
(74) *Attorney, Agent, or Firm* — Robert C. Kowert; Meyertons, Hood, Kivlin, Kowert & Goetzel, P.C.

(57) ABSTRACT

Ranges of data stored within archived data may be retrieved according to a predefined hash tree schema. A retrieval request for a range of one or more data chunks of an archived data object stored in archival data store may be retrieved. In response, the requested range of the archived data object may be determined to be tree-hash aligned. In response to determining that the requested range is tree-hash aligned, a retrieval job may be initiated to obtain the range of one or more data chunks and to stage the one or more data chunks for download. A download request may for one or more of the obtained and staged data chunks, and if determined to be tree-hash aligned, a tree hash root node may be sent to the requesting client in addition to the requested data.

17 Claims, 7 Drawing Sheets

RANGE RETRIEVALS FROM ARCHIVED DATA OBJECTS ACCORDING TO A PREDEFINED HASH TREE SCHEMA

BACKGROUND

As the technological capacity for organizations to create, track, and retain information continues to grow, a variety of different technologies for managing and storing the rising tide of information have been developed. Secure and reliable long-term data storage is one such technology that satisfies the need to archive collected information that may be used infrequently. Typically, information archives are stored on physical mediums, such as magnetic tape data storage, implemented on systems that may prove complex to operate and expensive to maintain. Information archives may not be easily accessible to clients who wish to retrieve archived data. Alternatively, archived data storage may be implemented using network-based storage, such as a cloud-based storage service. However, even these network-based solutions may still not provide quick access to archived data. Thus, in order to maintain the flexibility and cost effectiveness of these network-based solutions, data transport efficiency and integrity must be continually examined and improved.

Figure 1:
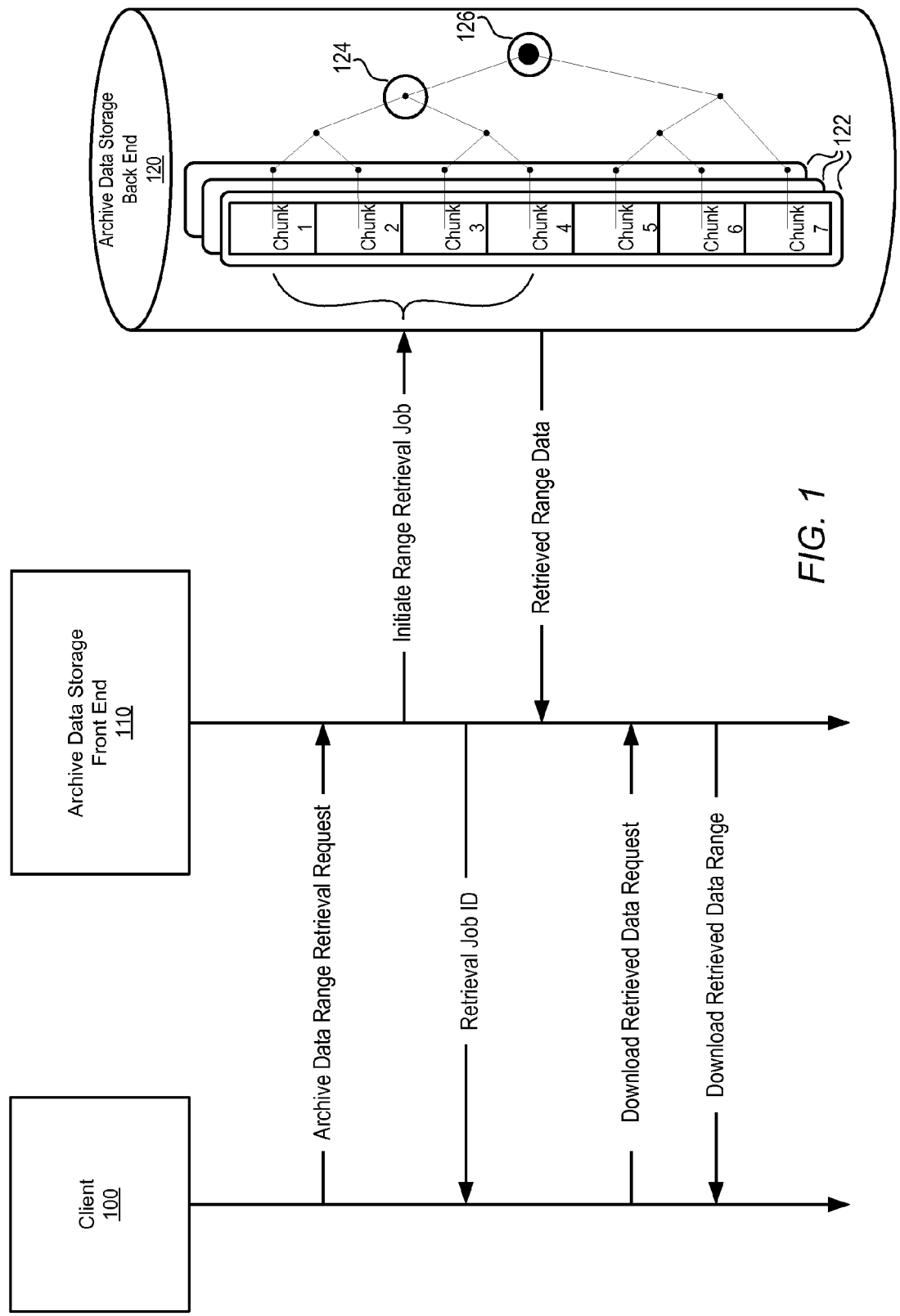
FIG. 1 illustrates a sequence diagram of a method to implement tree-hashed aligned range retrievals from archived data objects, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Various embodiments of tree-hash aligned range retrievals from archived data objects are described herein. Data may be stored for long periods of time in data archives. Typically, data archives are implemented on physical storage mediums, such as magnetic tape. The process of retrieving data archived in such a manner often requires that the specific tapes, or other physical mediums, be retrieved before the archived data may be read from the medium and sent to the requesting party. Network-based archived data storage systems, however, may be able to rely upon different methods and techniques, such as tree-hash aligned range retrievals, to retrieve data from data archives more quickly, efficiently, and securely.

FIG. 1 illustrates a sequence diagram of a method to implement tree-hashed aligned range retrievals from archived data objects stored in a network-based or other archival data store, according to some embodiments. Data archives, such as archive data storage back end 100, may be an archival data store, or any other form of network-based archive data storage system, such as one implemented on or more computing devices like those described below with regard to FIG. 7, that stores data in durable and persistent data storage, such as by storing data on many data storage devices, such as those discussed below with regard to FIGS. 2 and 3. Data may be sent to and retrieved from data storage using various methods and techniques for data transfer. However, in at least some embodiments, from the client's perspective, these data storage archives may not be directly addressable (e.g., a client may not directly request or receive data from the data storage devices, i.e., that data is not "online" for the client). FIG. 1 illustrates this point. Client 100 may communicate directly with archive data storage front end 110, which in turn retrieves data from archive data storage back end 120, before allowing the retrieved data to be downloaded from archive data storage front end 110 to client 100.

Archive data storage back end 120 may implement the computing and storage devices mentioned above to store archived data. Archived data may be structured, at least in some embodiments, as archived data objects. FIG. 1 illustrates archived data objects 122 stored within archive data storage back end. Archived data objects may be composed of one or more data chunks that represent a range of the archived data. For example, one data chunk may equal 1 megabyte (MB) of data stored in archive data storage back end 120. Data chunks may be of equal size relative to one another. In the illustration of FIG. 1, archived data objects 122 show data chunks 1 through 7. Please note, that the illustration shown in FIG. 1 is merely for illustrative purpose only and is not intended to limit the size or number of data objects or data chunks stored within archive data storage back end 120. For example, each archived data object may be of a different size, and thus may be composed of a different number of data chunks.

Client 100 may be any device, such as a computing device described below with regard to FIG. 7, configured to communicate with archive data storage front end 110. Client 100 may send or receive messages or other communications via a predefined protocol or application programming interface (API) to or from archive data storage front end 110. These communications may instruct the performance of many different operations on data stored in archive data storage back end 120. For example, client 100 may send a retrieval request for a range of data chunks to archive data storage front end 110. In at least some embodiments, the requested range of data chunks of the archived data object is less than the entire archived data object. In some embodiments, multiple retrieval requests may be received for the same or for different archived data objects. The ranges of these retrieval requests may also be of different or the same sizes of ranges.

Archive data storage front end 110, which may be implemented on or more computing devices, such as servers, or other computing devices described below with regard to FIG. 7, may determine whether the requested range of data chunks is tree hash aligned based, at least in part, on a predefined hash tree schema for the archive data object. In some embodiments, a tree-hash aligned range is determined when a root node of a hash tree for the requested range is equivalent to a node of the predefined hash tree schema for the entire archived data object. As illustrated in FIG. 1, the range retrieval request may be for data chunks 1 through 4 or archived data object 122. Root node 124 of a hash tree for data chunks 124 is equivalent to a node of a predefined hash tree schema 126 for the entire archived data object 122. In response to determining that the requested range is tree-hash aligned, archive data storage front end 110 may initiate a range retrieval job. In at least some embodiments, a retrieval job identifier that identifies the retrieval job initiated (or to be initiated) may be sent to client 100, such as via communication or message defined according to one of the various protocols or API discussed above.

The requested range of data chunks of the archived data object 122 may be transported to archive data storage front end 110. These data chunks may be staged (i.e., prepared) for download to client 100. Client 100 may send another message, a download retrieved data request message to archive data storage front end 110. The download request message may identify a sub-range of data chunks (or the entire requested range of data chunks) to be downloaded. This sub-range of data chunks may be evaluated to determine whether the sub-range of data chunks are tree-hash aligned, according to similar methods discussed above (and provided in further detail below with regard to FIGS. 4 through 6). In response to determining that the sub-range of the data chunks are tree-hash aligned, a root node of a hash tree for the sub-range of the data chunks may be included along with the data chunks themselves and sent to client 100. The root node of the hash tree for the sub-range of the data chunks may be used to perform an integrity check at client 100, using one of many different well-known hash tree integrity check techniques. However, in at least some embodiments, in response to determining that the sub-range of the download request message is not tree-hash aligned, then the data chunks of the sub-range may be sent to client 100 without sending a root node of a hash tree for the sub-range of data chunks.

Embodiments of range retrievals from archived data objects according to a predefined hash tree schema may be implemented in a variety of different archive storage systems. Archive data storage services, such as those offered by a network-based archive storage service offered to many different clients, may, for instance, implement range retrievals from archived data objects according to a predefined hash tree schema in such a way that clients may retrieve only portions of archived data that they desire, rather than an entire archive. For example, in at least some embodiments, an archived data object may be composed of multiple aggregated files, and a range retrieval request may obtain a specific one of those files from an archived data object. More generally, any system that archives data in a data store, such as those described above that are not directly accessible to a client, may implement various embodiments of range retrievals from archived data objects according to a predefined hash tree schema, and thus, the previous examples need not be limiting as to various other systems envisioned.

Example Embodiments of an Archive Data Storage System

Figure 2:
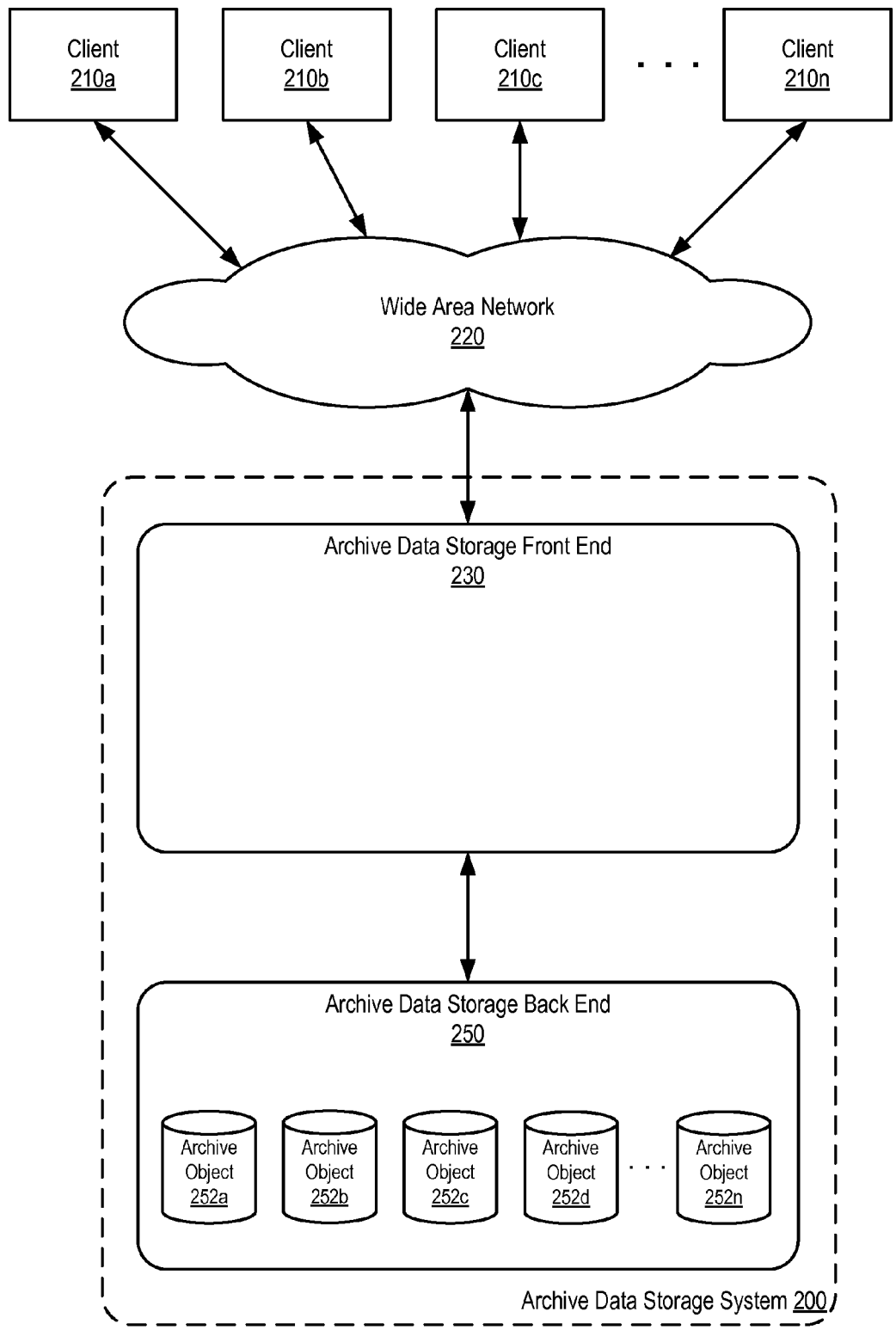
FIG. 2 is a block diagram illustrating an example operating environment for an archive data storage system, according to some embodiments.

As discussed above, various methods and techniques range retrievals from archived data objects according to a predefined hash tree schema may be implemented in a variety of different archive data storage systems. FIG. 2 illustrates an example operating environment for an archive data storage system that offers, for example, network-based data archive services (e.g., cloud-based storage) for many different clients, according to some embodiments.

Clients, 210*a*, 210*b*, 210*c*, etc. may communicate with archive data storage system 200, via Wide Area Network 220. As implied above, unless otherwise clear from context, the term "client" refers to the system(s) of a customer, purchase, user, or other entity (such as an individual, company or other organization) that utilizes data storage services described herein. Such systems may include datacenters, mainframes, individual computing devices, distributed computing environments and customer-accessible instances thereof or any other system capable of communicating with archive data storage system 200. In some embodiments, a client, such as clients 210, may refer to a machine instance (e.g., with direct hardware access) or virtual instance of a distributed computing system provided by a computing resource provider that also provides the archive data storage system 200. In some embodiments, archive data storage system 200 is integral to the distributed computing system and may include or be implemented by an instance, virtual or machine, of the distributed computing system. In various embodiments, WAN 220 may include, for example, the Internet. However, various other types of networks, protocols, and/or communication infrastructures may be utilized, such as private or local area network ("LAN"), a cellular data network and/or other data network.

In some embodiments, archive data storage system 200 may provide a multi-tenant or multi-client environment where each tenant or client may store, retrieve, delete or otherwise manage data in a data storage space allocated to the customer. For example, client 210a may have archive object 252a and 252b allocated. Alternatively, different client systems may be provided with authorization to access the same data stored in data storage. Client 210b and client 210c, for instance, may be two different systems that have authorization to access archive object 252c, because they are controlled by the same entity.

In some embodiments, archive data storage system 200 comprises multiple subsystems that each provides a particular set of services or functionalities. For example, as illustrated in FIG. 2, archive data storage system 200 includes archive data storage front end 230 and archive data storage back end 250. Each subsystem (sometimes referred to as "planes") may comprise one or more components, modules or other subsystems, such as those illustrated with regard to FIG. 3, that collectively provide the particular set of functionalities. Archive data storage front end 230 may, for example, act as an interface between clients 210 and archive data storage back end 250, as in various embodiments archive data storage back 250 may not be directly addressable or visible to clients 210. Similarly, archive storage system front end 230 may provide various control services and implementations for storing and managing data, such as the illustrated data archive objects 252, in archive data storage back end 250. Archive data storage back end 250 may provide various different storage components and systems, such as storage nodes implemented on database clusters or other storage devices to store archived data, such as archived data objects 252. Each component may be implemented by one or more physical and/or logical computing systems devices, such as computers, data storage devices, or any other type of computing device, such as those describe below with regard to FIG. 7. Components within each plane or subsystem may communicate with components within the same subsystem, components in other subsystems or external entities such as clients 210. At least some of such interactions are indicated by arrows in FIG. 2. However, FIG. 2 illustrates one example embodiment and is not intended to be limiting as to other different communication paths between clients and one or more subsystems or planes of archive data system 200. For example, although archive data storage back end 250 may not be directly addressable by clients 210, alternative means for uploading data for storage may be used, according to some embodiments. For example, another network-based service, such as another type of network-based storage service may be configured to upload data into archive data storage back end 250, or clients 210 may be able to send physical storage media to another service that may be able to directly upload the archive data to archive data storage back end 250. It will be appreciated by those of ordinary skill in the art that various embodiments may have fewer or a greater number of systems, subsystems and/or subcomponents than are illustrated in FIG. 2. Thus, the depiction of environment 200 in FIG. 2 should be taken as being illustrative in nature and not limiting to the scope of the disclosure.

Figure 3:
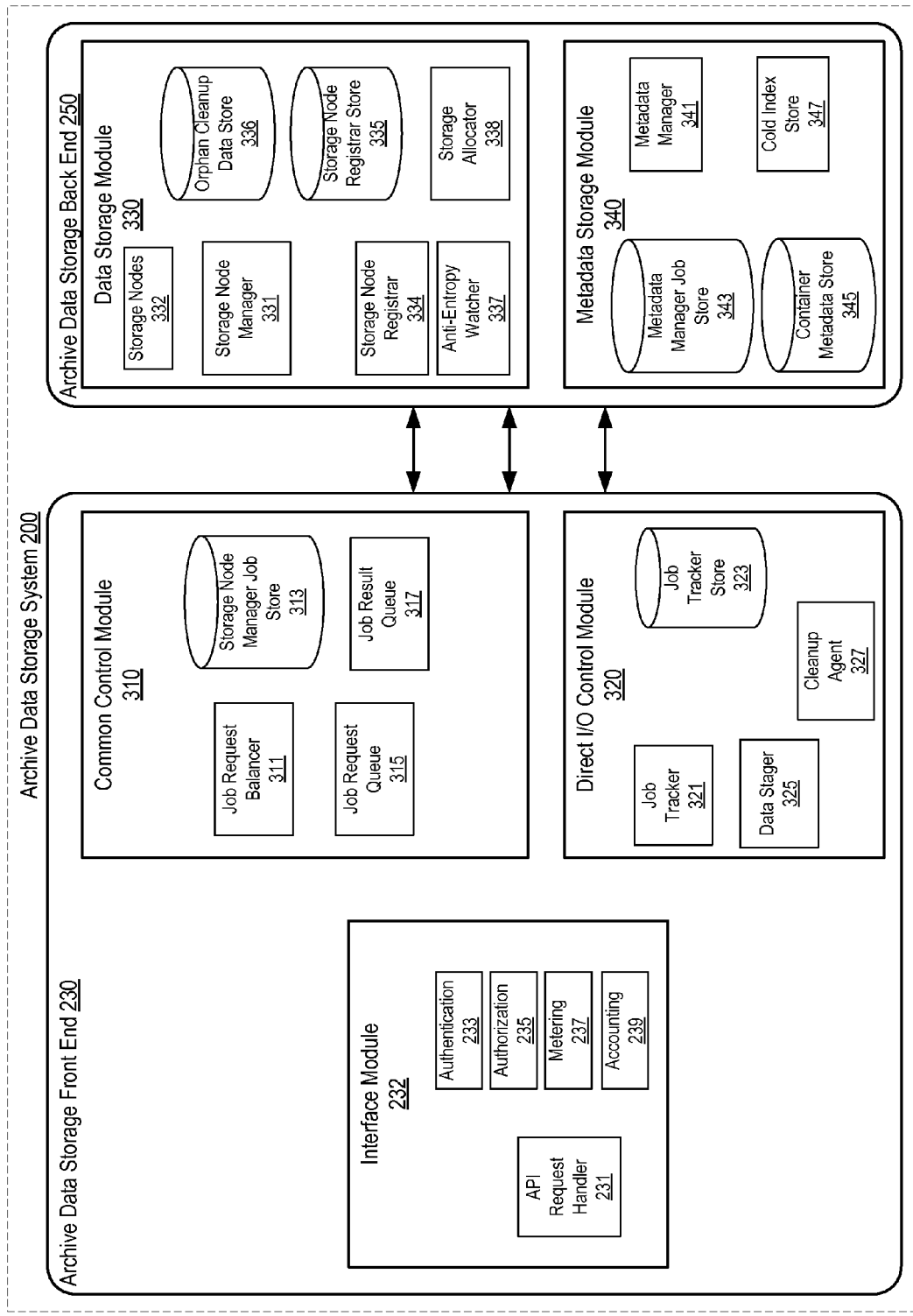
FIG. 3 is a block diagram illustrating an example archive data storage system, according to some embodiments.

FIG. 3 illustrates in greater detail various components, subsystems, and/or modules that may be included in archive data storage system 200, according to some embodiments. Interface module 232 may implement a group of services that provides an interface between archive data storage system 200 and external entities, such as one or more clients 210 described above with regard to FIG. 2. In various embodiments, archive data storage front end 230 may provide an application programming interface ("API") to enable a client device or application to programmatically interface with the various features, components and capabilities of archive data storage system 200. Such APIs may be part of a user interface that may include graphical user interfaces (GUIs), Web-based interfaces, programmatic interfaces such as application programming interfaces (APIs) and/or sets of remote procedure calls (RPCs) corresponding to interface elements, messaging interfaces in which the interface elements correspond to messages of a communication protocol, and/or suitable combinations thereof.

Capabilities provided by archive data storage system 200 may include data storage, data retrieval, data deletion, metadata operations, configuration of various operational parameters and the like. For example, in some embodiments, archive data storage system 200 may be configured to receive tree-hash aligned range retrieval requests, and in response, retrieve the requested range of data. Metadata operations may include requests to retrieve catalogs of data stored for a particular customer or account, data recovery requests, job inquires and the like. Configuration APIs may allow clients to configure account information, audit logs, policies, notifications settings and the like. A client may request the performance of any of the above operations by sending API requests to archive data storage system 200. Similarly, archive data storage system may provide responses to client requests. Such requests and responses may be submitted over any suitable communications protocol, such as Hypertext Transfer Protocol ("HTTP"), File Transfer Protocol ("FTP") and the like, in any suitable format, such as Representational State Transfer ("REST"), Simple Object Access Protocol ("SOAP") and the like. The requests and responses may be encoded, for example, using Base64 encoding, encrypted with a cryptographic key or the like.

In some embodiments, archive data storage system 200 allows customers to create one or more logical structures, such as logical data containers, in which to store one or more archived data objects. As used herein, archived data object is used broadly and does not necessarily imply any particular structure or relationship to other data. An archived data object, such as those illustrated in FIG. 2 discussed above, may be, for instance, simply a sequence of bits. Typically, such logical data structures may be created to meeting certain business requirements of customers, users, or clients and are independent from the physical organization of data stored in archive data storage system 200. As used herein, the term "logical data container" refers to a grouping of archived data objects. For example, archived data objects created for a specific purpose or during a specific period of time may be stored in the same logical data container. Each logical data container may include nested data containers or archived data objects and may be associated with a set of policies such as size limit of the container, maximum number of data objects that may be stored in the container, expiration date, access control list and the like. In various embodiments, logical data containers may be created, deleted or otherwise modified by customers via API requests, by a system administrator or by the data storage system, for example, based on configurable information. For example, the following HTTP PUT request may be received from a client, such as client 210 discussed above with regard to FIG. 2, to create a logical data container with name "logical-container-name" associated with a customer identified by an account identifier "accountId".

PUT /{accountId}/logical-container-name HTTP/1.1

In some embodiments, archive data storage system 200 may provide APIs for clients to store archived data objects into logical data containers. For example, the following HTTP POST request may be used, in an illustrative embodiment, to store an archived data object into a given logical container. The request may specify the logical path of the storage location, data length, reference to the data payload, a digital digest of the data payload and other information. In at least some embodiments, the digital digest of the data payload may be a root node of a hash tree of the data payload, discussed in more detail below with regard to FIGS. 4 through 6. In one embodiment, the APIs may allow a customer to upload multiple archived data objects to one or more logical data containers in one request. In another embodiment where the archived data object is large, the APIs may allow a customer to upload the archived data object in multiple parts, each with a portion of the archived data object, including a digest, such as root node of a hash tree for the archived data object.

POST /{accountId}/logical-container-name/data HTTP/1.1
Content-Length: 1128192
x-ABC-data-description: "annual-result-2012.xls"
x-ABC-md5-tree-hash: 634d9a0688aff95c In response to a data storage request, in an embodiment, archive data storage system 200 provides an archived data object identifier if the archived data object is stored successfully. An archived data object identifier may be used to retrieve, delete or otherwise refer to the stored archived data object in subsequent requests. In some embodiments, such an archived data object identifier may be "self-describing" in that it includes (for example, with or without encryption) storage location information that may be used by archive data storage system 200 to locate the archived data object without the need for an additional data structures such as a global namespace key map. In addition, in some embodiments, data object identifiers may also encode other information such as payload digest, such as a tree-hash of the data payload, error-detection code, access control data and the other information that may be used to validate subsequent requests and data integrity. In some embodiments, archive data storage system 200 stores incoming data in a transient durable data store before moving it archive data storage. Thus, from the user's perspective the data is persisted durably at the moment when an upload request is completed, actual storage to a long-term persisted data store may not commence until sometime later (e.g., 12 hours later). In some embodiments, the timing of the actual storage may depend on the size of the archived data object, the system load during a diurnal cycle, configurable information such as a service-level agreement between a customer and a storage service provider and other factors.

In some embodiments, archive data storage system 200 provides the APIs for clients to request the retrieval of data stored in archive data storage system 200, such as portions or all of archived data objects. In such embodiments, a client may request a job to perform data retrieval and may learn of completion of the job by a notification or by polling archive data storage system 200 for the status of the job. As used herein, a "job" refers to a data-related activity corresponding to a customer request that may be performed temporally independently from the time the request is received. For example, a job may include retrieving, storing and deleting data, retrieving metadata and the like. A job may be identified by a job identifier that may be unique, for example, among all the jobs for a particular customer. For example, the following HTTP POST request may be used, in an illustrative embodiment, to initiate a job to retrieve an archived data object identified by an archive data object identifier "dataObjectId." In other embodiments, a data retrieval request may request the retrieval of multiple archived data objects, archived data objects associated with a logical data container and the like.

POST /{accountId}/logical-data-container-name/data/{dataObjectId}HTTP/1.1

In response to the request, in some embodiments, archive data storage system 200 provides a retrieval job identifier ("job-id") that is assigned to the job in the following response. The response provides, in this example, a path to the storage location where the retrieved data will be stored.

HTTP/1.1 202 ACCEPTED
Location:/{accountId}/logical-data-container-name/jobs/{job-id}

At any given point in time, archive data storage system 200 may have many jobs pending for various data operations for a variety of different clients. In some embodiments, archive data storage system 200 may employ job planning and optimization techniques such as batch processing, load balancing, job coalescence and the like, to optimize system metrics such as cost, performance, scalability and the like. In some embodiments, the timing of the actual data retrieval depends on factors such as the size of the retrieved data, the system load and capacity, active status of storage devices and the like. For example, in some embodiments, at least some data storage devices in archive data storage system 200 may be activated or inactivated according to a power management schedule in order to reduce operational costs. Thus, retrieval of data stored in a currently active storage device (such as a rotating hard drive) may be faster than retrieval of data stored in a currently inactive storage device (such as a spinned-down hard drive).

In an embodiment, when a data retrieval job is completed, the retrieved data is stored in a staging data store and made available for customer download. In some embodiments, a client is notified of the change in status of a job by a configurable notification service. In other embodiments, a client may learn of the status of a job by polling the system using a job identifier. The following HTTP GET request may be used, in some embodiments, to download data that is retrieved by a job identified by "job-id," using a download path that has been previously provided.

GET/{accountId}/logical-data-container-name/jobs/{job-id}/output HTTP/1.1

In response to the GET request, in an illustrative embodiment, archive data storage system 200 may provide the retrieved data in the following HTTP response, with a tree-hash of the requested data for verification purposes.

HTTP/1.1 200 OK
Content-Length: 1128192
x-ABC-archive-description: "retrieved stuff"
x-ABC-md5-tree-hash: 693d9a7838aff95c
[1112192 bytes of user data follows]

In some embodiments, a client may request the deletion of an archived data object stored in an archive data storage system by specifying a data object identifier associated with the data object. For example, in an illustrative embodiment, an archived data object with archived data object identifier "dataObjectId" may be deleted using the following HTTP request. In some embodiments, a client may request the deletion of multiple data objects such as those associated with a particular logical data container.

DELETE /{accountId}/logical-data-container-name/data/{dataObjectId} HTTP/1.1

In various embodiments, archived data objects may be deleted in response to a client request or may be deleted automatically according to a user-specified or default expiration date. In some embodiments, archived data objects may be rendered inaccessible to clients upon expiration of some certain amount of time but remain recoverable during a grace period beyond the expiration time. In various embodiments, the grace period may be based on configurable information such as customer account configuration, service-level agreement terms and the like. In some embodiments, a client may be configured to query or receive notifications for pending data deletions and/or cancel one or more of the pending data deletions. For example, in one embodiment, a customer may set up notification configurations associated with a logical data container such that the customer will receive notifications of certain events pertinent to the logical data container. Such events may include the completion of a data retrieval job request, the completion of metadata request, deletion of archived data objects or logical data containers and the like.

In some embodiments, archive data storage system 200 also provides metadata APIs for retrieving and managing metadata such as metadata associated with logical data containers. In various embodiments, such requests may be handled asynchronously (where results are returned later) or synchronously (where results are returned immediately).

In various embodiments, at least some of the API requests discussed above are handled by API request handler 231 as part of interface module 232, which may be implemented as part of archive data storage front end 230. For example, API request handler 231 may decode and/or parse an incoming API request to extract information, such as uniform resource identifier ("URI"), requested action and associated parameters, identity information, archived data object identifiers and the like. In addition, API request handler 231 invoke other services (described below), where necessary, to further process the API request.

Figure 4:
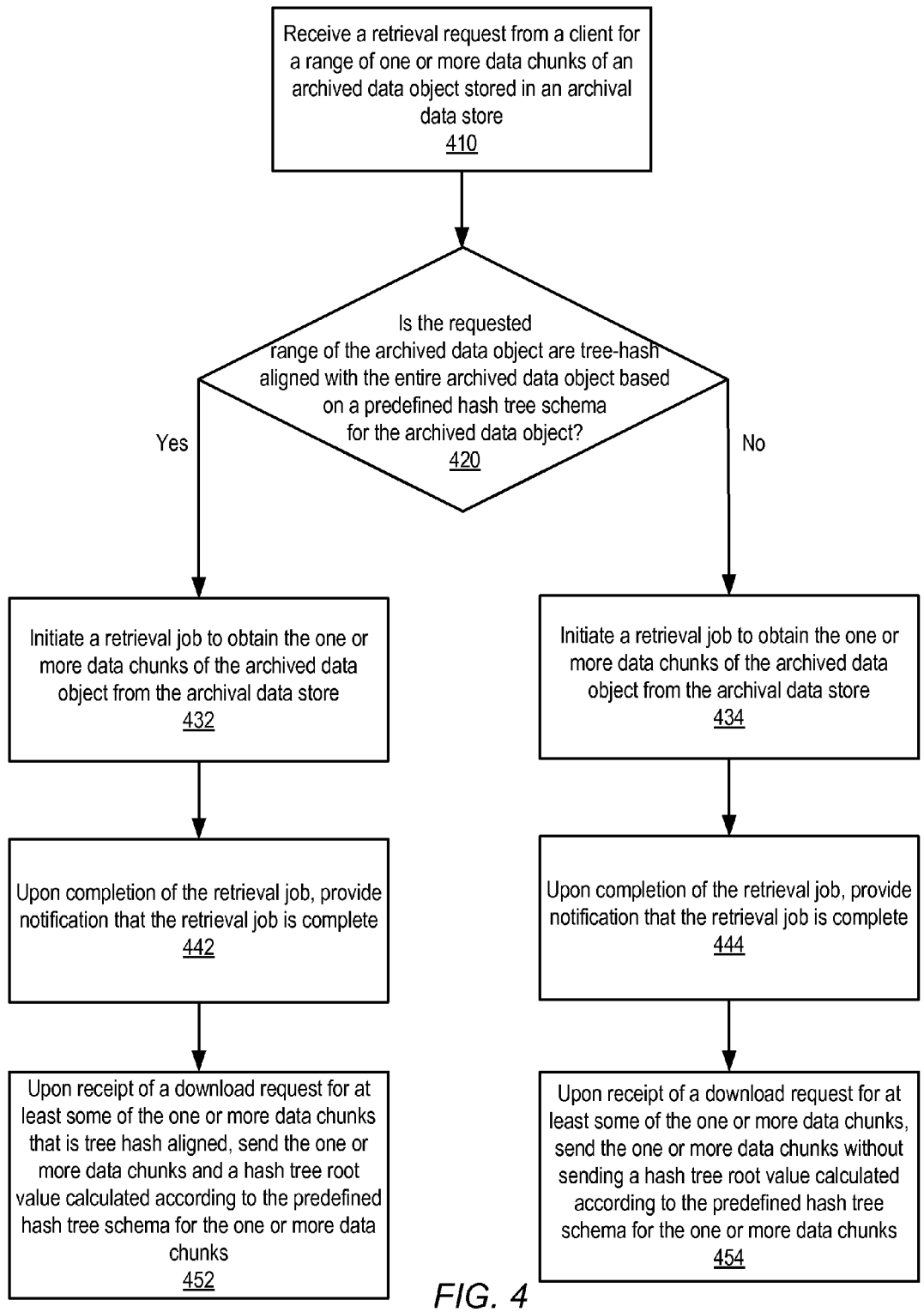
FIG. 4 is a high-level flowchart illustrating a method to implement range retrievals from archived data objects according to a predefined hash tree schema, according to some embodiments.
Figure 5:
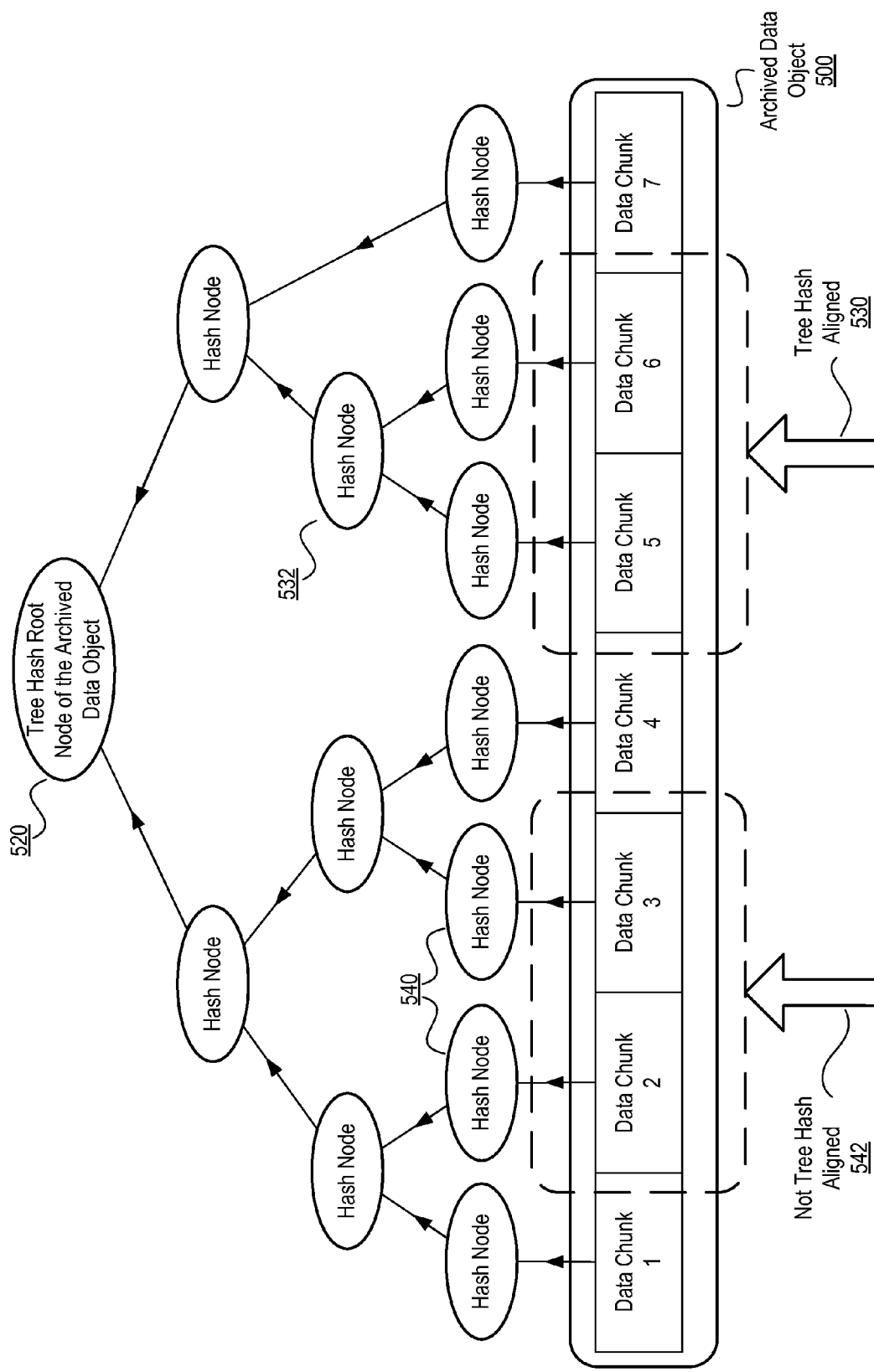
FIG. 5 is a block diagram illustrating an example of tree-hash aligned and non-tree-hash aligned retrieval ranges from an archived data object, according to some embodiments.
Figure 6:
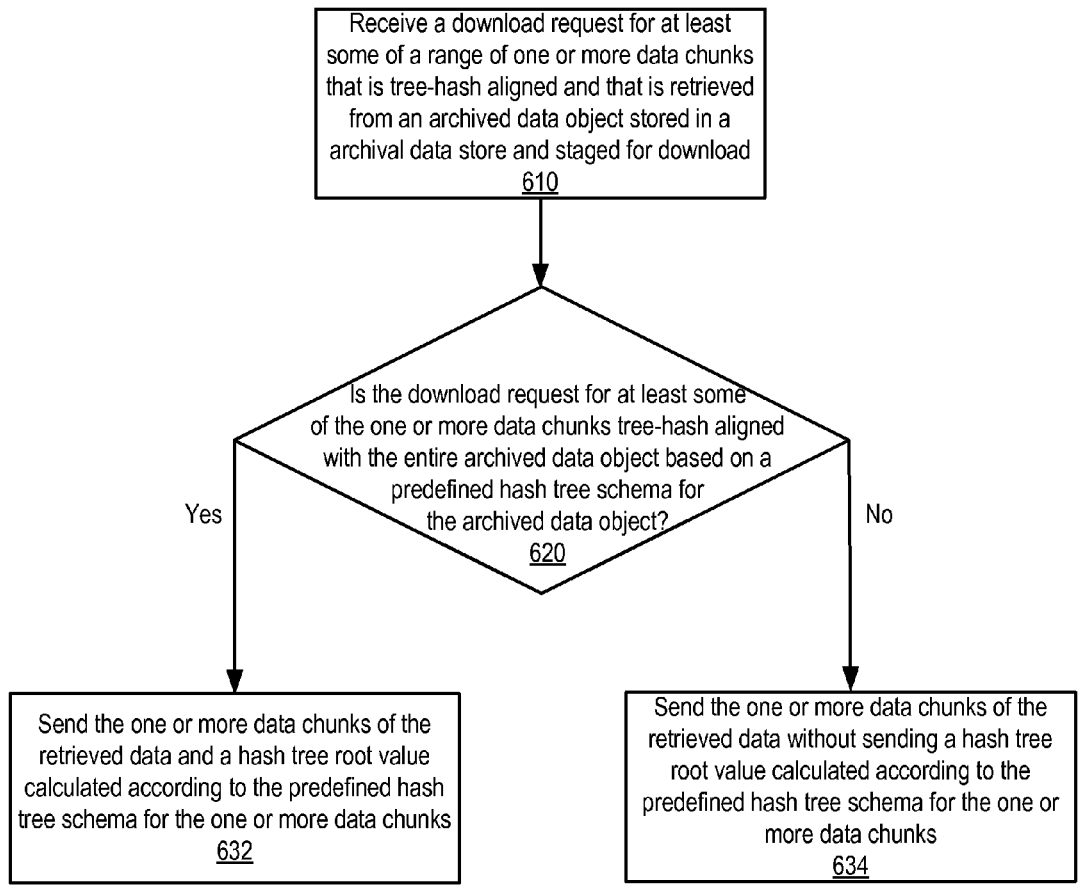
FIG. 6 is a high-level flowchart illustrating a method to download retrieved tree-hash aligned ranges of an archived data object, according to some embodiments.

API request handler 231 may receive, in at least some embodiments, retrieval requests for different ranges of one or more data chunks of archived data objects. The ranges may be less than the entire archived data object. API request handler 231 may also receive download requests for retrieved ranges of archived data objects that are staged for download. In both cases, API request handler 231 may determine whether requested ranges for retrieval or download requests are tree-hash aligned according to a predefined hash tree schema for the entire archived data object from which the requested data is retrieved. FIGS. 4 through 6 discussed below provide greater detail about how such determinations may be made. Additionally, in at least some embodiments, API request handler 231, or some other illustrated or not illustrated component of interface module 232, may be configured to calculate a root node of a hash tree for the range of data chunks requested in download request and include the calculated root node when sending the data to the requesting client.

In an embodiment, interface module 232 includes an authentication service 233 that may be invoked, for example, by API handler 231, to authenticate an API request. For example, in some embodiments, authentication service 233 may verify identity information submitted with the API request such as username and password Internet Protocol ("IP") address, cookies, digital certificate, digital signature and the like. In other embodiments, authentication service 233 may require the client to provide additional information or perform additional steps to authenticate the request, such as required in a multifactor authentication scheme, under a challenge-response authentication protocol and the like.

Interface module 232 includes an authorization service 235 that may be invoked, for example, by API handler 231, to determine whether a requested access is permitted according to one or more policies determined to be relevant to the request. For example, in one embodiment, authorization service 235 may verify that a requested access is directed to archived data objects contained in the requestor's own logical data containers or which the requester is otherwise authorized to access. In some embodiments, authorization service 235 or other services of interface module 232 may check the validity and integrity of a data request based at least in part on information encoded in the request, such as validation information encoded by an archived data object identifier, or by calculating a root node for a hash tree of data received at/via API request handler 231.

In some embodiments, interface module 232 may include a metering service 237 that monitors service usage information for each customer account such as data storage space used, number of archived data objects stored, data requests processed and the like. In some embodiments metering service 237 may determine a data retrieval metric, such as a peak data retrieval rate, which may, for example, be the amount of data retrieved from storage in archive data storage system 200 for a given unit of time. If, for instance, a client requests data retrieval of 140 gigabytes (GB) over the course of 4 hours, then the peak data retrieval rate may be 35 GB per hour. If instead, a client requests the same data amount 140 GB over 28 hours, then the peak data retrieval rate may be 5 GB per hour. In an embodiment, front end 230 also includes accounting service 239 that performs accounting and billing-related functionalities based, for example, on the metering information collected by the metering service 237, customer account information and the like. For example, a customer account may be charged a fee based on the storage space used by the customer, size and number of the data objects, types and number of requests submitted, customer account type, service level agreement the like. In some embodiments, a customer account linked to archived data object from which data chunks are retrieved, may be charged or recorded a fee based, at least in part, on the data retrieval metric for the retrievals. Thus, for example, by spreading out retrieval requests for ranges of data chunks of to retrieve an entire archived data object, the recorded fees of the multiple range retrieval requests may be less than the fee recorded for retrieving the entire archived data object in one request.

In at least some embodiments, interface module 232 batch processes some or all incoming requests from one client or multiple different clients, such as clients 210 described above with regard to FIG. 2. For example, interface module 232 may wait until a certain number of requests has been received before processing (e.g., authentication, authorization, accounting and the like) the requests. Such a batch processing of incoming requests may be used to gain efficiency.

Interface module 232 may invoke services provided by other subsystems of archive data storage system 200 to further process an API request. For example, interface module 232 may invoke services in metadata module 340 to fulfill metadata requests. For another example, interface module 232 may stream data in and out of direct I/O control module 320 for data storage and retrieval requests, respectively.

Archive data storage system 200 may also include direct I/O 320 control module implemented by one or more computing systems or devices as part of archive data storage front end 230. Direct I/O control module 320 provides services that create, track and manage jobs created as a result of requests received from clients. As discussed above, a job refers to an activity that may be performed asynchronously with regard to the received request, such as data retrieval, storage, metadata queries or the like. In some embodiments, direct I/O control module 320 includes a job tracker 321 that is configured to create job records or entries corresponding to client requests, such as those received from API request handler 231, and monitor the execution of the jobs. In various embodiments, a job record may include information related to the execution of a job such as a customer account identifier, job identifier, archive data object identifier, reference to data stager 325 (described below), job status, data validation information and the like. In some embodiments, job tracker 321 may collect information necessary to construct a job record from multiple requests. For example, when a large amount of data is requested to be stored, data upload may be broken into multiple requests, each uploading a portion of the data. In such a case, job tracker 321 may maintain information to keep track of the upload status to ensure that all data parts have been received before a job record is created. In some embodiments, job tracker 321 also obtains an archived data object identifier associated with the data to be stored and provides the archived data object identifier, for example, to a front end service to be returned to a customer. In some embodiments, an archived data object identifier may be obtained from data storage module 330 services such as storage node manager 331, storage node registrar 334, and the like, described below.

In some embodiments, direct I/O control module 320 includes a job tracker store 323 for storing job entries or records. In various embodiments, job tracker store 321 may be implemented by a NoSQL data management system, such as a key-value data store, a relational database management system ("RDBMS") or any other data storage system. In some embodiments, data stored in job tracker store 321 may be partitioned to enable fast enumeration of jobs that belong to a specific customer account or client, facilitate efficient bulk record deletion, parallel processing by separate instances of a service and the like. For example, job tracker store 321 may implement tables that are partitioned according to customer account identifiers and that use job identifiers as range keys. In an embodiment, job tracker store 321 is further sub-partitioned based on time (such as job expiration time) to facilitate job expiration and cleanup operations. In an embodiment, transactions against job tracker store 323 may be aggregated to reduce the total number of transactions. For example, in some embodiments, a job tracker 321 may perform aggregate multiple jobs corresponding to multiple requests into one single aggregated job before inserting it into job tracker store 323.

In an embodiment, job tracker 321 is configured to submit the job for further job scheduling and planning, for example, by services in common control module 310. Additionally, job tracker 321 may be configured to monitor the execution of jobs and update corresponding job records in job tracker store 323 as jobs are completed. In some embodiments, job tracker 321 may be further configured to handle customer queries such as job status queries. In some embodiments, job tracker 321 also provides notifications of job status changes to clients or other services of the archive data storage system. For example, when a data retrieval job is completed, job tracker 321 may provide a notification to a client (for example, using a notification service) that data is available for download. As another example, when a data storage job is completed, job tracker 321 may notify a cleanup agent 327 to remove data associated with the data storage job from data stager 325, described below.

In an embodiment, control plane for direct I/O 320 includes a data stager 325 for providing transient data storage services for data transiting between data storage module 330 and archive data storage front end 230. Such data includes incoming data pending storage and outgoing data pending customer download. As used herein, transient data store is used interchangeably with temporary or staging data store to refer to a data store that is used to store data objects before they are stored in an archive data storage described herein or to store data objects that are retrieved from the archive data storage. A transient data store may provide volatile or non-volatile (durable) storage. In most embodiments, while potentially usable for persistently storing data, a transient data store is intended to store data for a shorter period of time than an archive data storage system and may be less cost-effective than data archive storage system 200 described herein. In one embodiment, transient data storage services provided for incoming and outgoing data may be differentiated. For example, data storage for the incoming data, which is not yet persisted in archive data storage, may provide higher reliability and durability than data storage for outgoing (retrieved) data, which is already persisted in archive data storage. In another embodiment, transient storage may be optional for incoming data, that is, incoming data may be stored directly in archive data storage without being stored in transient data storage such as data stager 325, for example, when there is the system has sufficient bandwidth and/or capacity to do so.

Direct I/O control module 320 may, in some embodiments, also include a cleanup agent 327 that monitors job tracker store 323 and/or data stager 325 and removes data that is no longer needed. For example, payload data associated with a data storage request may be safely removed from data stager 325 after the data is persisted in permanent storage (e.g., data storage module 330). On the reverse path, data staged for download to client may be removed from data stager 325 after a configurable period of time (e.g., 30 days since the data is staged) or after an indication is received that the staged data is no longer needed.

In some embodiments, cleanup agent 327 removes a job record from job tracker store 323 when the job status indicates that the job is complete or aborted. As discussed above, in some embodiments, job tracker store 323 may be partitioned to enable to enable faster cleanup. In one embodiment where data is partitioned by customer account identifiers, cleanup agent 327 may remove an entire table that stores jobs for a particular customer account when the jobs are completed instead of deleting individual jobs one at a time. In another embodiment where data is further sub-partitioned based on job expiration time cleanup agent 327 may bulk-delete a whole partition or table of jobs after all the jobs in the partition expire. In other embodiments, cleanup agent 327 may receive instructions or control messages (such as indication that jobs are completed) from other services such as job tracker 321 that cause the cleanup agent 327 to remove job records from job tracker store 323 and/or data stager 325.

In various embodiments, archive data storage front end 230 may also include common control module 310 which may provide a queue-based load leveling service to dampen peak to average load levels (jobs) coming from control plane for I/O 320 and to deliver manageable workload to data plane 330. In an embodiment, common control plane 310 includes a job request queue 315 for receiving jobs created by job tracker 321 in direct I/O control module 320, described above, a storage node manager job store 313 from which services from data plane 330 (e.g., storage node managers 331) pick up work to execute and a job request balancer 311 for transferring job items from job request queue 315 to storage node manager job store 313 in an intelligent manner.

In an embodiment, job request queue 315 provides a service for inserting items into and removing items from a queue (e.g., first-in-first-out (FIFO) or first-in-last-out (FILO)), a set or any other suitable data structure. Job entries in the job request queue 315 may be similar to or different from job records stored in job tracker store 323, described above.

In an embodiment, common control plane 310 also provides a durable high efficiency job store, storage node manager job store 313, that allows services from data storage module 330 (e.g., storage node manager 331, anti-entropy watcher 337) to perform job planning optimization, check pointing and recovery. For example, in an embodiment, storage node manager job store 313 allows the job optimization such as batch processing, operation coalescing and the like by supporting scanning, querying, sorting or otherwise manipulating and managing job items stored in storage node manager job store 313. In an embodiment, a storage node manager 331 scans incoming jobs and sort the jobs by the type of data operation (e.g., read, write or delete), storage locations (e.g., volume, disk), customer account identifier and the like. The storage node manager 331 may then reorder, coalesce, group in batches or otherwise manipulate and schedule the jobs for processing. For example, in one embodiment, the storage node manager 331 may batch process all the write operations before all the read and delete operations. In another embodiment, the storage node manager 331 may perform operation coalescing. For another example, the storage node manager 331 may coalesce multiple retrieval jobs for the same archived data object into one job or cancel a storage job and a deletion job for the same archived data object where the deletion job comes after the storage job.

In some embodiments, storage node manager job store 313 is partitioned, for example, based on job identifiers, so as to allow independent processing of multiple storage node managers 331 and to provide even distribution of the incoming workload to all participating storage node managers 331. In various embodiments, storage node manager job store 313 may be implemented by a NoSQL data management system, such as a key-value data store, a RDBMS or any other data storage system.

In an embodiment, request balancer 311 provides a service for transferring job items from job request queue 315 to storage node manager job store 313 so as to smooth out variation in workload and to increase system availability. For example, request balancer 311 may transfer job items from job request queue 315 at a lower rate or at a smaller granularity when there is a surge in job requests coming into the job request queue 315 and vice versa when there is a lull in incoming job requests so as to maintain a relatively sustainable level of workload in the storage node manager store 313. In some embodiments, such sustainable level of workload is around the same or below the average workload of the system.

Job items that are completed may, in some embodiments, be removed from storage node manager job store 313 and added to the job result queue 317. A data storage module 330 services (e.g., storage node manager 331) may be responsible for removing the job items from the storage node manager job store 313 and adding them to job result queue 317. In some embodiments, job request queue 317 is implemented in a similar manner as job request queue 315, discussed above.

In some embodiments, archive data storage system 200 may include archive data storage back end 250, such as illustrated in FIG. 2 and FIG. 3. Archive data storage back end 250 may also include data storage module 330 which may provide services related to long-term archive data storage, retrieval and deletion, data management and placement, anti-entropy operations and the like. In various embodiments, data storage module 330 may include any number and type of storage entities such as data storage devices (such as tape drives, hard disk drives, solid state devices, and the like), storage nodes or servers, datacenters and the like. Such storage entities may be physical, virtual or any abstraction thereof (e.g., instances of distributed storage and/or computing systems) and may be organized into any topology, including hierarchical or tiered topologies. Similarly, the components of the data plane may be dispersed, local or any combination thereof. For example, various computing or storage components may be local or remote to any number of datacenters, servers or data storage devices, which in turn may be local or remote relative to one another. In various embodiments, physical storage entities may be designed for minimizing power and cooling costs by controlling the portions of physical hardware that are active (e.g., the number of hard drives that are actively rotating). In an embodiment, physical storage entities implement techniques, such as Shingled Magnetic Recording (SMR), to increase storage capacity.

One or more storage node managers 331, may in some embodiments, each control one or more storage nodes 332 by sending and receiving data and control messages. Each storage node 332 in turn controls a (potentially large) collection of data storage devices such as hard disk drives. In various embodiments, a storage node manager 331 may communicate with one or more storage nodes 332 and a storage node 332 may communicate with one or more storage node managers 331. In an embodiment, storage node managers 331 are implemented by one or more computing devices that are capable of performing relatively complex computations such as digest computation, such as calculating a tree hash of an archived data object or portion of archived data object, data encoding and decoding, job planning and optimization and the like. In at least some embodiments, storage node managers 331 may be configured to calculate hash trees for archived data objects stored in storage nodes 332 in order to perform integrity checks for the archived data objects to be stored. In some embodiments, storage nodes 332 are implemented by one or more computing devices with less powerful computation capabilities than storage node managers 331. Further, in some embodiments the storage node manager 331 may not be included in the data path. For example, data may be transmitted from the data stager 325 directly to the storage nodes 332 or from one or more storage nodes 332 to the data stager 325. In this way, the storage node manager 331 may transmit instructions to the data stager 325 and/or the storage nodes 332 without receiving the payloads directly from the data stager 325 and/or storage nodes 332. In various embodiments, a storage node manager 331 may send instructions or control messages to any other components of the archive data storage system 200 described herein to direct the flow of data.

Storage node manager 331 may, in some embodiments, serves as an entry point for jobs coming into and out of data storage module 330 by picking job items from common control plane 310 (e.g., storage node manager job store 313), retrieving staged data from data stager 325 and performing necessary data encoding for data storage jobs and requesting appropriate storage nodes 332 to store, retrieve or delete data. In at least some embodiments, storage node manager may determine whether a retrieval request's range is tree-hash aligned, according to the various techniques discussed below with regard to FIGS. 4 and 5. Once the storage nodes 332 finish performing the requested data operations, storage node manager 331 may perform additional processing, such as data decoding and storing retrieved data in data stager 325 for data retrieval jobs, and update job records in common control plane 310 (e.g., removing finished jobs from storage node manager job store 313 and adding them to job result queue 317).

In an embodiment, storage node manager 331 may perform data encoding according to one or more data encoding schemes before data storage to provide data redundancy, security and the like. Such data encoding schemes may include encryption schemes, redundancy encoding schemes such as erasure encoding, redundant array of independent disks (RAID) encoding schemes, replication and the like. Likewise, in an embodiment, storage node managers 331 performs corresponding data decoding schemes, such as decryption, erasure-decoding and the like, after data retrieval to restore the original data.

As discussed above in connection with storage node manager job store 313, storage node managers 331 may implement job planning and optimizations such as batch processing, operation coalescing and the like to increase efficiency. In some embodiments, jobs are partitioned among storage node managers so that there is little or no overlap between the partitions. Such embodiments facilitate parallel processing by multiple storage node managers, for example, by reducing the probability of racing or locking.

In various embodiments, data storage module 330 may be implemented to facilitate data integrity. For example, storage entities handling bulk data flows such as storage nodes managers 331 and/or storage nodes 332 may validate the digest of data stored or retrieved, such as the tree-hash of the data stored and retrieved relying upon integrity checks that use hash trees that are well-known to those of ordinary skill in the art, check the error-detection code to ensure integrity of metadata and the like.

In various embodiments, data storage module 330 may be implemented to facilitate scalability and reliability of the archive data storage system. For example, in one embodiment, storage node managers 331 maintain no or little internal state so that they can be added, removed or replaced with little adverse impact. In one embodiment, each storage device is a self-contained and self-describing storage unit capable of providing information about data stored thereon. Such information may be used to facilitate data recovery in case of data loss. Furthermore, in one embodiment, each storage node 332 is capable of collecting and reporting information about the storage node including the network location of the storage node and storage information of connected storage devices to one or more storage node registrars 334 and/or storage node registrar stores 335. In some embodiments, storage nodes 332 perform such self-reporting at system start up time and periodically provide updated information. In various embodiments, such a self-reporting approach provides dynamic and up-to-date directory information without the need to maintain a global namespace key map or index which can grow substantially as large amounts of data objects are stored in the archive data system.

Data storage module 330 may also include one or more storage node registrars 334 that provide directory information for storage entities and data stored thereon, data placement services and the like. Storage node registrars 334 may communicate with and act as a front end service to one or more storage node registrar stores 335, which provide storage for the storage node registrars 334. In various embodiments, storage node registrar store 335 may be implemented by a NoSQL data management system, such as a key-value data store, a RDBMS or any other data storage system. In some embodiments, storage node registrar stores 335 may be partitioned to enable parallel processing by multiple instances of services. As discussed above, in an embodiment, information stored at storage node registrar store 335 may be based at least in part on information reported by storage nodes 332 themselves.

In some embodiments, storage node registrars 334 provide directory service, for example, to storage node managers 331 that want to determine which storage nodes 332 to contact for data storage, retrieval and deletion operations. For example, given a volume identifier provided by a storage node manager 331, storage node registrars 334 may provide, based on a mapping maintained in a storage node registrar store 335, a list of storage nodes that host volume components corresponding to the volume identifier. Specifically, in one embodiment, storage node registrar store 335 stores a mapping between a list of identifiers of volumes or volume components and endpoints, such as Domain Name System (DNS) names, of storage nodes that host the volumes or volume components.

As used herein, a "volume" refers to a logical storage space within a data storage system in which data objects may be stored. A volume may be identified by a volume identifier. A volume may reside in one physical storage device (e.g., a hard disk) or span across multiple storage devices. In the latter case, a volume comprises a plurality of volume components each residing on a different storage device. As used herein, a "volume component" refers a portion of a volume that is physically stored in a storage entity such as a storage device. Volume components for the same volume may be stored on different storage entities. In one embodiment, when data is encoded by a redundancy encoding scheme (e.g., erasure coding scheme, RAID, replication), each encoded data component or "shard" may be stored in a different volume component to provide fault tolerance and isolation. In some embodiments, a volume component is identified by a volume component identifier that includes a volume identifier and a shard slot identifier. As used herein, a shard slot identifies a particular shard, row or stripe of data in a redundancy encoding scheme. For example, in one embodiment, a shard slot corresponds to an erasure coding matrix row. In some embodiments, storage node registrar store 335 also stores information about volumes or volume components such as total, used and free space, number of archived data objects stored and the like.

In some embodiments, data storage module 330 also includes a storage allocator 338 for allocating storage space (e.g., volumes) on storage nodes to store new archived data objects, based at least in part on information maintained by storage node registrar store 335, to satisfy data isolation and fault tolerance constraints. In some embodiments, storage allocator 338 requires manual intervention.

In some embodiments, data plane 330 also includes an anti-entropy watcher 337 for detecting entropic effects and initiating anti-entropy correction routines. For example, anti-entropy watcher 337 may be responsible for monitoring activities and status of all storage entities such as storage nodes, reconciling live or actual data with maintained data and the like. In various embodiments, entropic effects include, but are not limited to, performance degradation due to data fragmentation resulting from repeated write and rewrite cycles, hardware wear (e.g., of magnetic media), data unavailability and/or data loss due to hardware/software malfunction, environmental factors, physical destruction of hardware, random chance or other causes. Anti-entropy watcher 337 may detect such effects and in some embodiments may preemptively and/or reactively institute anti-entropy correction routines and/or policies.

In an embodiment, anti-entropy watcher 337 causes storage nodes 332 to perform periodic anti-entropy scans on storage devices connected to the storage nodes. Anti-entropy watcher 337 may also inject requests in job request queue 315 (and subsequently job result queue 317) to collect information, recover data and the like. In some embodiments, anti-entropy watcher 337 may perform scans, for example, on cold index store 347, described below, and storage nodes 332, to ensure referential integrity.

In an embodiment, information stored at storage node registrar store 335 is used by a variety of services such as storage node registrar 334, storage allocator 338, anti-entropy watcher 337 and the like. For example, storage node registrar 334 may provide data location and placement services (e.g., to storage node managers 331) during data storage, retrieval and deletion. For example, given the size of an archived data object to be stored and information maintained by storage node registrar store 335, a storage node registrar 334 may determine where (e.g., volume) to store the data object and provides an indication of the storage location of the archived data object which may be used to generate an archived data object identifier associated with the archived data object. As another example, in an embodiment, storage allocator 338 uses information stored in storage node registrar store 335 to create and place volume components for new volumes in specific storage nodes to satisfy isolation and fault tolerance constraints. As yet another example, in an embodiment, anti-entropy watcher 337 uses information stored in storage node registrar store 335 to detect entropic effects such as data loss, hardware failure and the like.

In some embodiments, data storage module 330 also includes an orphan cleanup data store 336, which is used to track orphans in the storage system. As used herein, an orphan is a stored archived data object that is not referenced by any external entity. In various embodiments, orphan cleanup data store 336 may be implemented by a NoSQL data management system, such as a key-value data store, an RDBMS or any other data storage system. In some embodiments, storage node registrars 334 stores object placement information in orphan cleanup data store 336. Subsequently, information stored in orphan cleanup data store 336 may be compared, for example, by an anti-entropy watcher 337, with information maintained in metadata plane 340. If an orphan is detected, in some embodiments, a request is inserted in the common control plane 310 to delete the orphan.

Archive data storage back end 250 may also include metadata storage module 340. In various embodiments, metadata storage module 340 provides information about archived data objects stored in the system for inventory and accounting purposes, to satisfy customer metadata inquiries and the like. In the illustrated embodiment, metadata storage module 340 includes a metadata manager job store 343 which stores information about executed transactions based on entries from job result queue 317 in common control module 310. In various embodiments, metadata manager job store 343 may be implemented by a NoSQL data management system, such as a key-value data store, a RDBMS or any other data storage system. In some embodiments, metadata manager job store 343 is partitioned and sub-partitioned, for example, based on logical data containers, to facilitate parallel processing by multiple instances of services such as metadata manager 341.

In the illustrative embodiment, metadata plane 340 also includes one or more metadata managers 341 for generating a cold index of data objects (e.g., stored in cold index store 347) based on records in metadata manager job store 343. As used herein, a "cold" index refers to an index that is updated infrequently. In various embodiments, a cold index is maintained to reduce cost overhead. In some embodiments, multiple metadata managers 341 may periodically read and process records from different partitions in metadata manager job store 343 in parallel and store the result in a cold index store 347.

In some embodiments cold index store 347 may be implemented by a reliable and durable data storage service. In some embodiments, cold index store 347 is configured to handle metadata requests initiated by customers. For example, a customer may issue a request to list all data objects contained in a given logical data container. In response to such a request, cold index store 347 may provide a list of identifiers of all data objects contained in the logical data container based on information maintained by cold index 347. In some embodiments, an operation may take a relative long period of time and the customer may be provided a job identifier to retrieve the result when the job is done. In other embodiments, cold index store 347 is configured to handle inquiries from other services, for example, from interface module 232 for inventory, accounting and billing purposes.

In some embodiments, metadata storage module 340 may also include a container metadata store 345 that stores information about logical data containers such as container ownership, policies, usage and the like. Such information may be used, for example, by interface module 232, to perform authorization, metering, accounting and the like. In various embodiments, container metadata store 345 may be implemented by a NoSQL data management system, such as a key-value data store, a RDBMS or any other data storage system.

As described herein, in various embodiments, archive data storage system 200 described herein may be implemented to be efficient and scalable. For example, in some embodiments, batch processing and request coalescing may be used at various stages (e.g., front end request handling, control plane job request handling, data plane data request handling) to improve efficiency. Similarly, data integrity checks may also be implemented at various stages, such as by comparing tree-hash values of all or portions of archived data objects. For another example, in an embodiment, processing of metadata such as jobs, requests and the like are partitioned so as to facilitate parallel processing of the partitions by multiple instances of services.

In some embodiments, archived data objects stored in the archive data storage system (such as data components, volumes, described below) may be self-describing so as to avoid the need for a global index data structure. For example, in one embodiment, archived data objects stored in the system may be addressable by archived data object identifiers that encode storage location information. For another example, in another embodiment, volumes may store information about which archived data objects are stored in the volume and storage nodes and devices storing such volumes may collectively report their inventory and hardware information to provide a global view of the data stored in the system (such as evidenced by information stored in storage node registrar store 335). In such an embodiment, the global view is provided for efficiency only and may not be required to locate data stored in the system.

In various embodiments, the archive data storage system described herein is implemented to improve data reliability and durability. For example, in an embodiment, an archived data object is redundantly encoded into a plurality of data components and stored across different data storage entities to provide fault tolerance. For another example, in an embodiment, data elements have multiple levels of integrity checks, such as by comparing a tree hash aligned. In an embodiment, parent/child relations always have additional information to ensure full referential integrity. In various embodiments, bulk data transmission and storage paths are protected by having the client pre-calculate the digest, such as a tree hash, on the data before transmission and subsequently supply the digest with the data to a receiver. The receiver of the data transmission is responsible for recalculation, such as by calculating another tree hash, comparing and then acknowledging to the sender that includes the recalculated digest. Such data integrity checks may be implemented, for example, by multiple components and services described within archive data storage front end 230 and archive data storage back end 250, and as such, is not intended to be limiting as to the number of times performed, or the location or component configured to perform the data integrity checks.

Workflow of Tree-Hash Aligned Range Retrievals from Archived Data Objects

As has been discussed above, archived data storage systems, such as archived data storage system 200 discussed above with regard to FIGS. 2 and 3, may be configured to utilize tree-hash aligned range retrievals from archived data objects to provide more efficiency and maintain integrity for data management functions. However, as has also been mentioned, using tree-hash aligned range retrievals may provide efficiency benefits more generally to any type of archive data storage for managing and storing archived data. FIG. 4 is a high-level flowchart illustrating a method to implement range retrievals from archived data objects according to a predefined hash tree schema, according to some embodiments. Various different systems and devices may implement the various methods and techniques described below. Archive data storage front end 230 as described above in FIG. 3, may implement the various methods alone or conjunction with other systems and components, such as archive data storage back end 250 in FIG. 3. Therefore, the above examples and or any other systems or devices referenced as performing the illustrated method, are not intended to be limiting as to other different individual or groups of components or configurations of systems and devices.

In various embodiments, a retrieval request for a range of one or more data chunks of an archived data object stored in an archival data store may be received, as indicated at 410. The retrieval request may be formatted according to one of varying messaging protocols or APIs, such as those discussed above with regard to FIGS. 1 through 3. The request may be formatted to include several fields of information. For example, the request may include an identifier that indicates the particular archived data object stored in a data store from which to retrieve the range of one or more data chunks. In at least some embodiments, the request may also include location of the range of data chunks, such as data chunks 10 to 24.

Multiple retrieval requests may be received from the same or one or more different clients. For example, an archive data storage system, such as archived data storage system 200 described above with regard to FIGS. 2 and 3, may be implemented as a service, such as a network-based archive storage service, storing multiple archived data objects for multiple different customers. The archive data storage system may then receive multiple retrieval requests from different customers pertaining to the archived data objects stored for the customers of the service.

Multiple retrieval requests may also be requests for ranges of the same or different sizes, to request different numbers of data chunks from the same archived data object. For example, an archived data object may be composed of 16 data chunks, each 1 megabyte (MB). A first retrieval request may be for the range of data chunks from 1 to 4, whereas a second retrieval request may be for the range of data chunks 9 to 16. Retrieval requests for a range of data chunks of an archived data object may not need to be received in any particular order, such as the logical ordering of the data chunks. Using the previous example, the retrieval request for data chunks 9 to 16 may be received before the retrieval request for data chunks 1 to 4, though they occur logically after data chunks 1 to 4.

In at least some embodiments, multiple retrieval requests may be used to efficiently retrieve large archived data objects in a cost-efficient manner by reducing the data transfer requirements to retrieve a single larger archived data object within a certain period of time. A variety of different service metering or billing techniques may be used. If in some embodiments, for instance, in response to the completion of a retrieval job for a requested range of data chunks of an archived data object a data retrieval metric may be determined based, at least in part, on the data chunks retrieved from the archival data store. A data retrieval service fee may be recorded, such as recorded against a customer account linked to the archived data object. The data retrieval service may be determined based, at least in part, on the data retrieval metric. If, for example, a client requests data retrieval of 140 gigabytes (GB) over the course of 4 hours, then the peak data retrieval rate may be 35 GB per hour. If instead, a client requests the same data amount 140 GB over 28 hours, then the peak data retrieval rate may be 5 GB per hour. A customer account may be charged a fee based may be charged or recorded a fee based, at least in part, on the data retrieval metric for the retrievals. The higher the data retrieval metric, then the higher the recorded fee, at least in some embodiments. Therefore, multiple retrieval requests may be used to reduce costs for retrieving a larger archived data object.

A retrieval job identifier may be generated and sent back to a client (or device, party or entity) that requested the range of one or more data chunks for retrieval, in at least some embodiments. A retrieval job identifier may be used to identify a retrieval job initiated (or to be initiated). Retrieval job identifiers may be recorded or stored, such as in job tracker 321 discussed above with regard to FIG. 3. In some embodiments, retrieval job identifiers may be included with varying requests regarding the retrieval job, such as job status requests. A client, may be able to use retrieval job identifiers to track which portions of an archived data object have been retrieved and/or download. Therefore, if a client desired to combine the retrieved ranges of an archived data object together, a job retrieval identifier may be provide the information necessary to reconstruct the downloaded data into its original format.

In addition to retrieval requests other types of requests may be received, such as job status requests, upload requests, download requests, etc. One such type of request, job status requests, may be received to determine the status of a requested retrieval of data chunks. As noted above the request may include a retrieval job identifier that identifies the specific retrieval job initiated (or to be initiated). A job status message, indicating the current status of the retrieval job indicated by the retrieval job identifier may be generated. The current status may be one of many different job statuses including, but not limited, "received," "in-process," "complete," or any other type of phrase or indicator that may be interpreted to determine the status of the retrieval job. Job status may also provide an estimated time until completion of the retrieval job, or some other estimate of the work remaining to retrieve the requested data chunks from the archived data object, such as a rate at which data chunks are being transported from the data store.

Returning to FIG. 4, in response to receiving the retrieval request for one or more data chunks, it may be determined whether the requested range of the one or more data chunks of the archived data object is tree-hash aligned with the entire archived data object based on a predefined hash tree schema for the archived data object, as indicated at 420. In various embodiments, a tree-hash aligned range may be determined when a root node of a hash tree for the one or more data chunks is equivalent to a root node or leaf node of a hash tree for the archived data object in order to determine that the one or more data chunks are tree-hash aligned. FIG. 5 is a block diagram illustrating examples of tree-hash aligned and non-tree-hash aligned retrieval ranges from an archived data object, according to some embodiments.

Archived data object 500 is represented as composed of one or more data chunks, illustrated as data chunks 1 through 7. Illustrated above the archived data object is a hash tree composed of multiple hash nodes, with each node representing the result of a hash function applied to the leaf values indicated below a given node. As hash trees themselves are well-known to those of ordinary skill in the art, the illustrated hash tree in FIG. 5 is not intended to be limiting as to other types and forms of hash trees. For example, although FIG. 5 illustrates a binary hash tree (two child/leaf nodes for every parent node) other sizes of hash trees may be implemented. Similarly, one of a variety of different hash functions may be applied to generate the hash nodes of the hash tree (e.g., cryptographic hash functions, including, but not limited to, GOST, HAVAL, MD2, MD5, RIPEMD, SHA-0, SHA-256, etc.). Various techniques to construct a hash tree are well-known to those of ordinary skill in the art. In FIG. 5, a hash tree has been constructed for archived data object 500. Root node 520 is the tree hash root node of the archive data object. When, as discussed earlier with regard to FIGS. 2 and 3, and later with regard to FIG. 6, a root node of hash tree is to be calculated, sent, or received, element 520 is an example of a root node that is calculated, sent, or received.

As discussed earlier, a retrieval request may include a range of one or more data chunks to retrieve. Such ranges may be tree-hash aligned or non-tree-hash aligned. Element 542 illustrates a request of a non-tree-hash aligned requested range, data chunks 2 and 3. To determine whether a range of data chunks is tree hash aligned, a root node of a hash tree for the requested range may be a node of predefined hash tree schema for the entire archived data object. A predefined hash tree schema may, in some embodiments, be the schema used to construct a hash tree for an entire archived data object. In FIG. 5, for instance, the hash tree constructed for archived data object 500 is binary hash tree that may be constructucted using a specific hash algorithm, such as SHA-256, that is applied to generate each node of the hash tree. In FIG. 5, if hash tree were calculated for the requested range of data chunks 2 and 3, the resultant root hash value would be a hash of the values of data stored in data chunks 2 and 3. The predefined hash tree schema for the entire archived data object 500, however, does not include a node that is hash of data chunks 2 and 3. As illustrated at 540, data chunk 2 is hash to form node with data chunk 1. Data chunk 3 is hashed to form a node with data chunk 4. Therefore, the requested range of data chunks 2 and 3 may not be hash-tree aligned with entire archived data object 500. Range retrieval request for data chunks 5 and 6, indicated at 530 is hash tree-aligned. The hash of the values of data chunk 5 and 6 is a hash node in the predefined hash tree scheme for the entire archived data object 500, hash node 532.

Please note, that FIG. 5 is provided for illustrative purpose only, and is not intended as to be limiting to other ways of determining whether a requested range of data chunks are tree-hash aligned. In some embodiments, for example, various arithmetic formulas may be implemented to determine whether a given requested range is hash tree aligned. For example, if the predefined hash tree schema implements a binary hash tree for the archived data object, consider [P, Q] as the range query for an archive of N data chunks and P and Q are multiples of one data chunk. With these considerations, then:

If P is an odd number, there is only one possible tree-hash aligned range—that is [P, P+1].

If P is an even number and k is the maximum number, where P can be written as 2k*X, then there are at most k tree-hash aligned ranges that start with P. X is an integer greater than 0. The tree-hash aligned ranges fall in the following categories:

For each i, where (0<=i<=k) and where P+2i<N, then [P, Q+2i) is a tree-hash aligned range.

P=0 is the special case where A=2[lgN]*0.

Although throughout the various illustrations of archived data objects in the Figures, archived data objects have been shown to contain equal sized data chunks, in some embodiments on or more data chunks may represent a different range of data relative to other data chunks in the archived data object. For instance, if a data chunk represents a 1 MB range of data in the archived data object, and the archived data object itself is not exactly divisible by 1 MB data chunks, then the last data chunk may represent the remaining archived data that is less than 1 MB, while all other data chunks may represent 1 MB.

After determining that the requested range of the one or more data chunks of the archived data object is tree hash aligned, a retrieval job to obtain the requested range of one or more data chunks of the archived data object from the archival data store may be initiated, as indicated at 432. Initiating the retrieval job may, as illustrated in FIG. 1, may be performed by sending a retrieval job request message to an archival data store, such as archive data storage back end 250 described above with regards to FIGS. 2 and 3. In some embodiments, this retrieval request may be performed within a period of time defined by a service level agreement or other rule or policy, such as within 4 hours. Data that is retrieved may be staged for download, such as at a transient data store like data stager 325 described above with regard to FIG. 3.

In at least some embodiments, upon completion of the retrieval job, notification may be provided to the requesting client that the retrieval job is complete, as indicated at 442. This notification may be a message or other communication sent directly to the client, or may employ alternative or third-party messaging services, such as notification service discussed above with regard to interface module 230 in FIG. 3. The message or communication may, for example, include the retrieval job identifier generated for the retrieval job. A download request may be received for the retrieved range of data, and if tree-hash aligned, a hash tree root value calculated according to the predefined hash tree schema for the requested data chunks along with the data chunks themselves, as indicated at 452. FIG. 6, discussed below, describes in greater detail a workflow for processing download requests.

Alternatively, in at least some embodiments, the requested range of the archived data object may be determined to not be tree-hash aligned, according to the various techniques discussed above. A retrieval job to obtain and stage the one or more data chunks of the archived data object from the archival data store may be initiated, as indicated at 434, in a manner similar to the retrieval job initiated at 432. Also similarly, upon completion of the retrieval job, notification may be provided to the client that the retrieval job is complete, as indicated at 444. However, if a download request, such as the download requests discussed below with regard to FIG. 6 is received for some or all of the requested range of data chunks that are not tree-hash aligned, then the data chunks alone may be sent to the requesting download client without sending a root node of a hash tree calculated for the download requested data chunks, as indicated at 454.

FIG. 6 is a high-level flowchart illustrating a method to download retrieved data of an archived data object, according to some embodiments. A download request may be received for at least some of a tree-hash aligned range of one or more data chunks that have been retrieved from an archival data store and staged for download, as indicated at 610. Similar to the retrieval request message discussed above with regard to 410, a download request may include various types of information, such as a retrieval job identifier that identifies the requested range of data that has been retrieved from storage. A download request message may also indicate a one or more data chunks to be download, such as a sub-range of the retrieved range. For example, if the previously retrieved data chunks number 1 through 8, then the download request message may include a request to download data chunks 1 through 4. In some embodiments, multiple download requests may be received to download data from a previously retrieved range of data. The size of the download requests may or may not be the same. For example, the first download request may request to download data chunks 1 and 2, while the second download request may request to download data chunks 5 through 8.

It may be determined whether the download request for at least some of the range of the one or more data chunks is tree-hash aligned with the entire archived data object based, at least in part, on a predefined hash tree schema for the archived data object, as indicated at 620. Thus, similar to element 420 discussed above with regard to FIG. 4, the data chunks of the download request may be determined to be tree-hash aligned or non-tree-hash aligned. The methods and techniques discussed above may also be used to make the same determination with respect to the download request. Referring back to FIG. 5, if, for example, data chunks 5 through 8 were retrieved as a range request, and a download request for data chunks 5 and 6 were received, the download request would be tree-hash aligned. Also similarly, if the data chunks 1 through 4 were retrieved by a range request, and a download request of data chunks 2 and 3 were received, then the download request would not be tree-hash aligned.

If the download request is determined to be tree-hash aligned, then the requested data chunks and a hash tree root value calculated according to the predefined hash tree schema may be sent to the requesting client, as indicated at 632. A client may use the hash tree root value for data integrity, as a checksum for instance, to determine whether or not the data download from the archive is the same as the data that was initially sent to the archive data storage system for storage. Thus, continuing with the example given above, the data of data chunks 5 and 6 would be sent to the client and hash node 532 would be sent to the client. Alternatively, if the download request is not determined to be tree-hash aligned, then the requested data chunks is sent to the requesting client without sending a hash tree root value calculated according to the predefined hash tree schema, as indicated at 634. Thus, a download request for data chunks 2 and 3 in FIG. 5, may only be responded to with the data represented by data chunks 2 and 3 without sending a hash node value.

Various components or systems, such as archive data storage front end 230, may be configured to implement various forms of the methods and techniques discussed below. For example, data stager 325 discussed above with regard to FIG. 3, may determine, as indicated at 620, whether the requested range of the archived data object are tree-hash aligned with the entire archived data object based on a predefined hash tree schema for the archived data object. API request handler 231 may, for instance, receive the download request, as indicated at 610, and send the one or more data chunks with or without the root node of the hash tree calculated for the one or more data chunks, as indicated at 632. However, numerous other components, of archive data storage system 230, or of any other archive data storage system may implement the techniques discussed above, and as such the previous examples are not intended to be limiting.

FIGS. 4 and 6 are illustrated as flow charts representing possible techniques for implementing range retrievals from archived data objects according to a predefined hash tree schema, according to some embodiments. However, the illustrated elements may be performed in differing orders, or with additional elements added to, or elements subtracted from the illustrated examples, and as such, are not intended to be limiting.

Example System

Embodiments of range retrievals from archived data objects according to a predefined hash tree schema as described herein may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions as described herein are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 7:
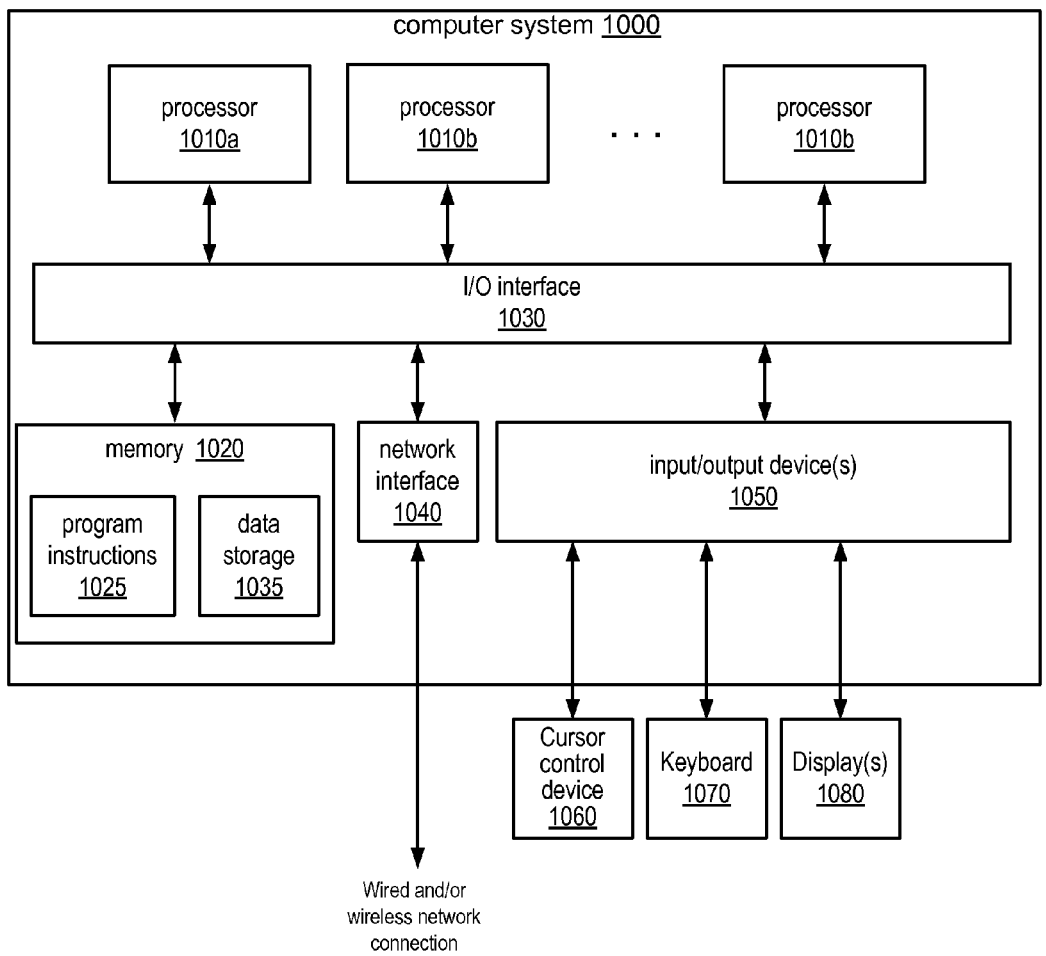
FIG. 7 illustrates an example system, according to some embodiments.

As shown in FIG. 7, memory 1020 may include program instructions 1025, configured to implement the various embodiments of range retrievals from archived data objects according to a predefined hash tree schema as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. An archive data storage system, comprising:
one or more computer processors configured to implement:
an archive data storage back end, configured to store one or more archived data objects, wherein each of the archived data objects is organized according to a plurality of data chunks, wherein each data chunk corresponds to a range of data stored within the archived data object;
an archive data storage front end, configured to:
receive a retrieval request for a range of one or more data chunks of an archived data object, wherein the range of the one or more data chunks is less than the entire archived data object;
in response to receiving the retrieval request:
determine that, when a root node of a hash tree for the requested range is equivalent to a predefined hash tree schema for the entire archived data object, the range of the one or more data chunks is tree-hash aligned;
initiate a retrieval job to obtain the one or more data chunks of the archived data object from the archive data storage system back end; and
stage the obtained one or more data chunks in the archive data storage front end for download;
upon completion of the retrieval job to obtain the one or more data chunks of the archived data object from the archive data storage back end, send a retrieval job completion notification to a client;
receive a download request from the client for at least some of the range of the one or more data chunks; and
in response to receiving the download request:
determine whether a root node of a hash tree for the requested download of the at least some of the range of the one or more data chunks is equivalent to a node of the predefined hash tree schema for the entire archived data object in order to determine whether the root node of the hash tree for the requested download is tree-hash aligned; and
send to the client one or more data chunks matching the at least some of the range and, when the root node of the hash tree for the requested download being tree-hash aligned, a hash value of a root node of a tree hash calculated according to the predefined hash tree schema for the at least some of the range of the one or more data chunks.

2. The system of claim 1, wherein the archive data storage front end is further configured to:
receive another retrieval request for another range of other one or more data chunks of the archived data object, wherein the other range of the other one or more data chunks is less than the entire archived data object;
in response to receiving the other retrieval request:
determine that a root node of a hash tree for the requested other range is not equivalent to a node of the predefined hash tree schema for the entire archived data object in order to determine that the other range of the other one or more data chunks is not tree-hash aligned;
initiate another retrieval job to obtain the other one or more data chunks of the archived data object from the archive data storage back end; and
stage the other obtained one or more data chunks in the archive data storage front end for download;
upon completion of the retrieval job to obtain the other one or more data chunks of the archived data object from the archive data storage back end, send a retrieval job completion notification to the client;
receive a download request from the client for at least some of the other range of the other one or more data chunks;
in response to receiving the download request, sending to the client one or more data chunks matching the at least some of the other range without sending a root node of a tree hash calculated according to the predefined hash tree schema for the at least some of the other range of the other one or more data chunks.

3. A method, comprising:
performing, by multiple computing devices:
receiving a retrieval request, from a client, for a range of one or more data chunks of an archived data object stored in an archival data store, wherein
the archived data object is organized as a plurality of data chunks including the one or more data chunks,
each data chunk of the plurality of data chunks corresponds to a range of data stored within the archived data object, and
the range of one or more data chunks is less than the entire archived data object;
in response to receiving the retrieval request:
determining that the requested range of the archived data object is tree-hash aligned with the archived data object based, at least in part, on a node of a hash tree for the requested range being equivalent to a node of a predefined hash tree schema for the archived data object; and
initiating a retrieval job to obtain one or more data chunks of the archived data object matching the requested range from the archival data store;
receiving a download request from the client for at least some of the range of the one or more data chunks; and
in response to the receiving the download request:
determining whether a root node of a hash tree for the requested download of the at least some of the range of the one or more data chunks is equivalent to a node of the predefined hash tree schema for the entire archived data object in order to determine whether the root node of the hash tree for the requested download is tree-hash aligned; and sending to the client one or more data chunks matching the at least some of the range and, when the root node of the hash tree for the requested download being tree-hash aligned, a hash value of a root node of a tree hash calculated according to the predefined hash tree schema for the at least some of the range of the one or more data chunks.

4. The method of claim 3, the method further comprising:
in response to the initiating the retrieval job to obtain the requested one or more data chunks of the archived data object from the archival data store:
staging the obtained one or more data chunks for download.

5. The method of claim 4, further comprising, upon completion of the retrieval job to obtain the requested range of the one or more data chunks of the archived data object, providing notification that the retrieval job is complete to the client.

6. The method of claim 4, further comprising, in response to receiving the retrieval request for the range of the one or more data chunks of the archived data object, sending a retrieval job identifier that identifies the retrieval job initiated to obtain the requested range of the one or more data chunks of the archived data object from the archival data store.

7. The method of claim 6, further comprising:
receiving another download request including the retrieval job identifier for at least some other ones of the requested range of the one or more data chunks; and
in response to receiving the other download request:
determining that the other download request for the at least some other ones of the requested range of the one or more data chunks of the archived data object is tree-hash aligned with the archived data object based, at least in part, on the predefined hash tree schema for the archived data object; and
sending one or more data chunks matching the at least some other ones of the requested range and a root node of a tree hash calculated according to the predefined hash tree schema for the at least some other ones of the requested range of the one or more data chunks.

8. The method of claim 4, further comprising:
receiving another retrieval request for another range of one or more data chunks of the archived data object, wherein the other range of one or more data chunks is less than the entire archived data object;
in response to receiving the other retrieval request:
determining that the other requested range of the archived data object is not tree-hash aligned with the entire archived data object based, at least in part, on the predefined hash tree schema for the archived data object;
initiating another retrieval job to obtain one or more data chunks of the archived data object matching the other requested range from the archival data store and staging the obtained one or more data chunks of the other requested range for download; and
upon completion of the retrieval job, sending a retrieval job completion notification for the other retrieval job to the client.

9. The method of claim 8, further comprising:
receiving a download request for at least some of the other requested range of the one or more data chunks; and
in response to receiving the download request, sending one or more data chunks matching the at least some of the other requested range without sending a root node of a tree hash calculated according to the predefined hash tree schema for the at least some of the other requested range of the one or more data chunks.

10. The method of claim 4, wherein:
the multiple computing devices are implemented as part of a network-based archive data storage service,
the archived data object is one of a plurality of different archived data objects stored in the archival data store,
a plurality of different customer accounts for one or more network-based services including the network-based archive data storage service are linked to the plurality of different archived data objects, and
the client is authorized to access the archived data object via a customer account of the plurality of different customer accounts linked to the archived data object.

11. The method of claim 10, wherein the method further comprises:
in response to the completion of the retrieval job for the requested range of the one or more data chunks of the archived data object:
determining a data retrieval metric based, at least in part, on the one or more data chunks retrieved from the archival data store; and
recording a data retrieval service fee for the customer account linked to the archived data object based, at least in part, on the data retrieval metric.

12. A non-transitory, computer-readable storage medium, storing program instructions that when executed by multiple computing devices implements:
receiving a retrieval request, from a client, for a range of one or more data chunks of an archived data object stored in an archival data store, wherein
the archived data object is organized as a plurality of data chunks including the one or more data chunks,
each data chunk of the plurality of data chunks corresponds to a range of data stored within the archived data object, and
the range of the one or more data chunks is less than the entire archived data object;
in response to receiving the retrieval request:
determining that the range of the one or more data chunks of the archived data object is tree-hash aligned with the entire archived data object based, at least in part, on a node of a hash tree for the requested range being equivalent to a node of a predefined hash tree schema for the archived data object;
initiating a retrieval job to obtain one or more data chunks of the archived data object matching the requested range from the archival data store and staging the obtained one or more data chunks for download;
sending a retrieval job identifier to the client that identifies the retrieval job initiated to obtain the requested range of the one or more data chunks of the archived data object; and
upon completion of the retrieval job to obtain the one or more data chunks of the archived data object, sending notification to the client that the retrieval job is complete;
receiving a download request from the client for at least some of the range of the one or more data chunks; and
in response to said receiving the download request:
determining whether a root node of a hash tree for the requested download of the at least some of the range of the one or more data chunks is equivalent to a node of the predefined hash tree schema for the entire archived data object in order to determine whether the root node of the hash tree for the requested download is tree-hash aligned; and sending to the client one or more data chunks matching the at least some of the range and, when the root node of the hash tree for the requested download being tree-hash aligned, a hash value of a root node of a tree hash calculated according to the predefined hash tree schema for the at least some of the range of the one or more data chunks.

13. The non-transitory, computer-readable storage medium of claim 12, wherein the program instructions when executed by the multiple computing devices further implement:

receiving another download request including the retrieval job identifier for at least some other ones of the requested range of the one or more data chunks; and in response to receiving the other download request:
determining that the other download request for the at least some other ones of the requested range of the one or more data chunks of the archived data object is not tree-hash aligned with the archived data object based, at least in part, on the predefined hash tree schema for the archived data object; and sending one or more data chunks matching the at least some other ones of the requested range without sending a root node of a tree hash calculated according to the predefined hash tree schema for the at least some other ones of the requested range of the one or more data chunks.

14. The non-transitory, computer-readable storage medium of claim 13, wherein the program instructions when executed by the multiple computing devices further implement:

receiving another retrieval request for another range of one or more data chunks of the archived data object, wherein the other range of one or more data chunks is less than all of the archived data object, wherein the other range is a different size than the range of the one or more data chunks of the archived data object;

in response to receiving the other retrieval request:
determining that the other requested range of the archived data object is tree-hash aligned with the archived data object based, at least in part, on the predefined hash tree schema for the archived data object;

initiating another retrieval job to obtain one or more data chunks of the archived data object matching the other requested range from the archival data store and staging the obtained one or more data chunks of the other requested range for download;

sending another retrieval job identifier to the client that identifies the other retrieval job; and upon completion of the other retrieval job, sending another retrieval job completion notification for the other retrieval job to the client.

15. The non-transitory, computer-readable storage medium of claim 13, wherein the archived data object comprises an aggregation of a plurality of separate data files, and wherein the one or more data chunks of the retrieval request comprise one of the plurality of separate data files.

16. The non-transitory, computer-readable storage medium of claim 12, wherein
the multiple computing devices are implemented as part of a network-based archive data storage service,
the archived data object is one of a plurality of different archived data objects stored in the archival data store,
a plurality of different customer accounts for one or more network-based services including the network-based archive data storage service are linked to the plurality of different archived data objects,
the client is authorized to access the archived data object via a customer account of the plurality of different customer accounts linked to the archived data object, and
the program instructions when executed by the multiple computing devices further implement:
in response to the completion of the retrieval job for the requested range of the one or more data chunks of the archived data object:
determining a data retrieval metric based, at least in part, on the one or more data chunks retrieved from the archival data store; and
recording a data retrieval service fee for the customer account linked to the archived data object based, at least in part, on the data retrieval metric.

17. The non-transitory, computer-readable storage medium of claim 16, wherein one or more other retrieval requests are received to retrieve the entire archived data object, wherein data retrieval service fees determined for these retrieval requests summed with the data retrieval service fee are less than a data retrieval service determined based, at least in part, on a data retrieval metric for retrieving the entire archived data object in one retrieval request.

* * * * *